US007028939B2

(12) United States Patent
Liao

(10) Patent No.: US 7,028,939 B2
(45) Date of Patent: Apr. 18, 2006

(54) ASSEMBLED WINDLASS STRUCTURE

(76) Inventor: Sheng Hsin Liao, No. 10, Alley 38, Lane 229, San Chun St., Shulin City, Taipei Hsien (TW)

(*) Notice: Subject to any disclaimer, the term of this patent is extended or adjusted under 35 U.S.C. 154(b) by 0 days.

(21) Appl. No.: 10/778,251

(22) Filed: Feb. 17, 2004

(65) Prior Publication Data
US 2005/0178871 A1 Aug. 18, 2005

(51) Int. Cl.
B65H 75/48 (2006.01)
(52) U.S. Cl. .................................. 242/378; 242/378.1
(58) Field of Classification Search ............. 242/378.1, 242/378
See application file for complete search history.

(56) References Cited
U.S. PATENT DOCUMENTS
6,315,231 B1 * 11/2001 Liaom ..................... 242/378.1
6,378,797 B1 * 4/2002 Liao ...................... 242/378.1
6,474,585 B1 * 11/2002 Liao ...................... 242/378.1
6,808,138 B1 * 10/2004 Liao ...................... 242/378.1
6,866,218 B1 * 3/2005 Liao ...................... 242/378.1
2002/0040945 A1 * 4/2002 Stepancich et al. ...... 242/378.1

* cited by examiner

Primary Examiner—Kathy Matecki
Assistant Examiner—Sang Kim
(74) Attorney, Agent, or Firm—Rosenberg, Klein & Lee

(57) ABSTRACT

An assembled windlass structure has a casing, a winding box, a communication wire, a spring, and a main body. The casing has a top cover and a bottom cover. The casing has a receiving space formed between the top cover and the bottom. The communication wire has two connectors connected to two ends thereof, respectively. The communication wire is wound in the winding box and two ends of the communication wire are extended out of the casing. The spring is connected between the casing and the winding box. The main body has an assembly groove. The casing can be fixed in or separated from the assembly groove. The casing and the main body can be assembled together or separated for use.

12 Claims, 8 Drawing Sheets

ASSEMBLED WINDLASS STRUCTURE

BACKGROUND OF THE INVENTION (1) Field of The Invention

The present invention relates to an assembled windlass structure, and especially to a windlass structure having a communication wire that can be automatically returned and fabricated by assembly.

(2) Description of the Related

A communication wire is a necessary member of all communication equipment including, for example, computers, cable modems, telephones and fax machines.

Referring to FIG. 1, the prior art provides a windlass 10a having a communication wires 11a. When the communication wire 11a with two ends is connected to the communication equipment, the windlass 10a will be suspended in midair. Because the weight of the windlass 10a, the useful length of the communication wire 11a is reduced.

With the employment of unique considerations and application of theories, and based on several years experience in specialized production of all flexible assembly systems and mechanisms, the inventor has come up with an innovative pivot structure for a foldable product.

SUMMARY OF THE INVENTION

The primary object of the present invention is to provide an assembled windlass structure. The assembled windlass structure is composed of a casing and a main body. The casing and the main body can be assembled together or separated for use. In other words, the casing can be used alone or assembled on the main body for use by user. Because the casing is light, the communication wire will have a greater useful length than that of prior art.

In order to achieve the above objects, the present invention provides assembled windlass structure. The assembled windlass structure comprises a casing, a winding box, a communication wire, a spring, and a main body the casing has a top cover and a bottom cover assembled together, and a receiving space formed between the top cover and the bottom cover. The winding box is rotatably arranged in the receiving space.

The communication wire with two ends has a connector; the communication wire is wound around the winding box, and the two ends of the communication wire project out of the casing. The spring is connected between the casing and the winding box. The main body has an assembly groove for receiving and fixing the casing, and a plurality of receiving grooves for receiving any kind of connected head.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The various objects and advantages of the present invention will be more readily understood from the following detailed description when read in conjunction with the appended drawing, in which.

DETAILED DESCRIPTION OF THE PREFERRED EMBODIMENT

Figure 1:
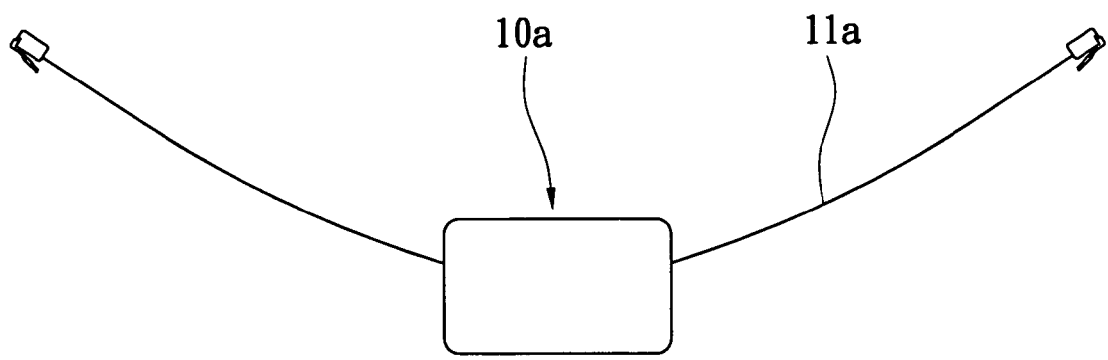
FIG. 1 is a perspective view of the prior art in use.
Figure 2:
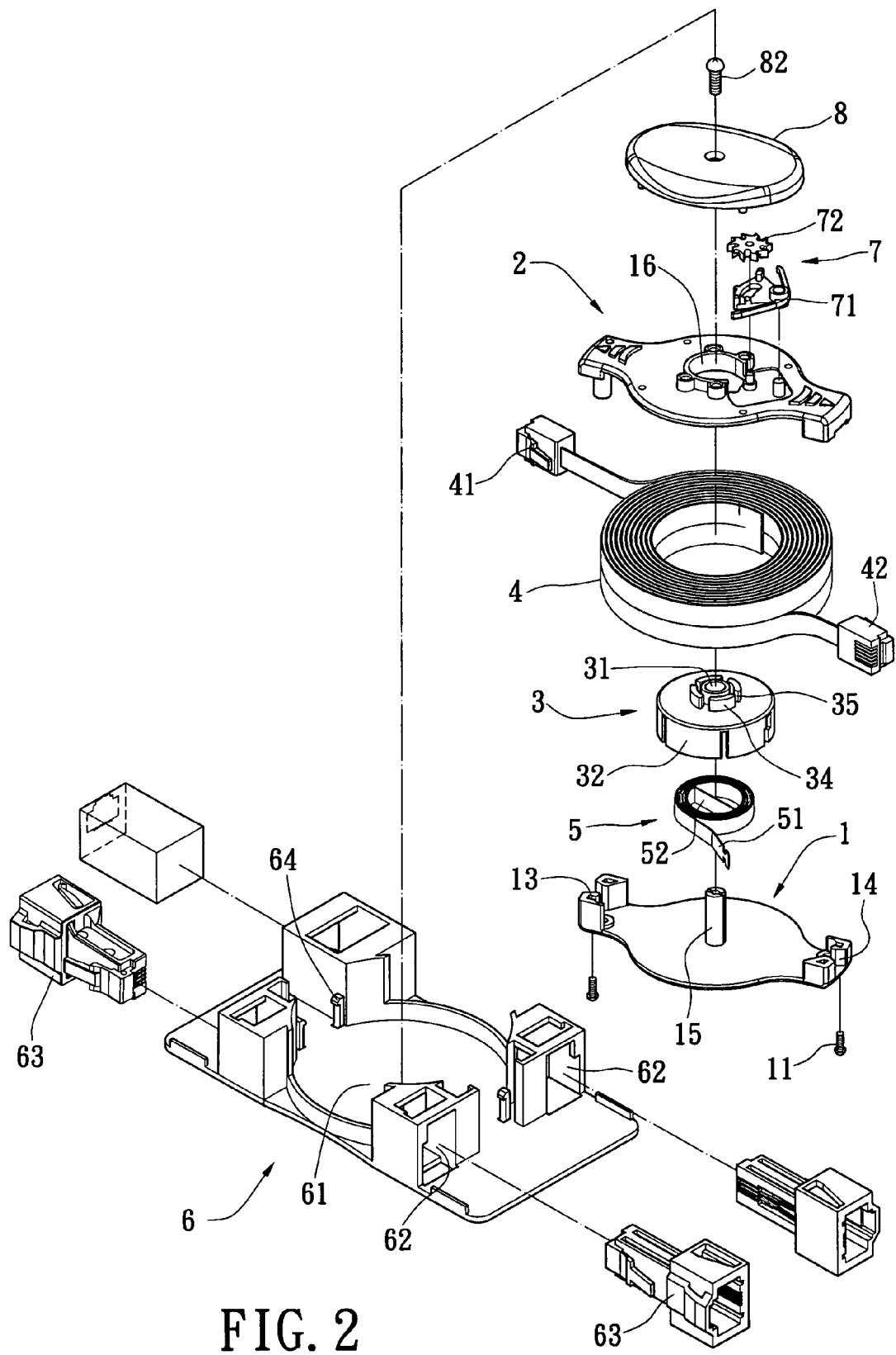
FIG. 2 is an exploded view according to the first embodiment of the present invention.
Figure 3:
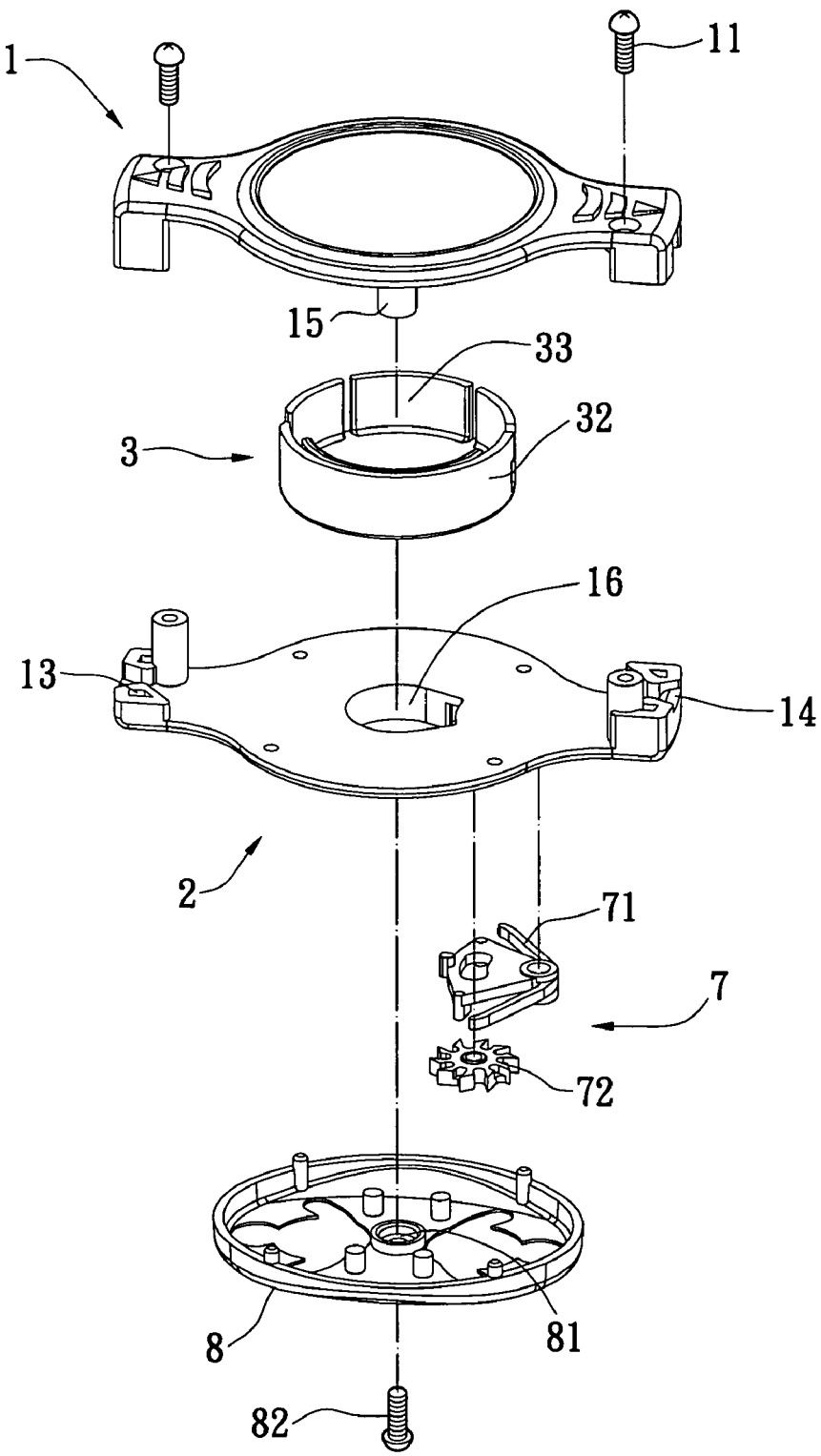
FIG. 3 is another exploded view of according to the first embodiment of the present invention.
Figure 4:
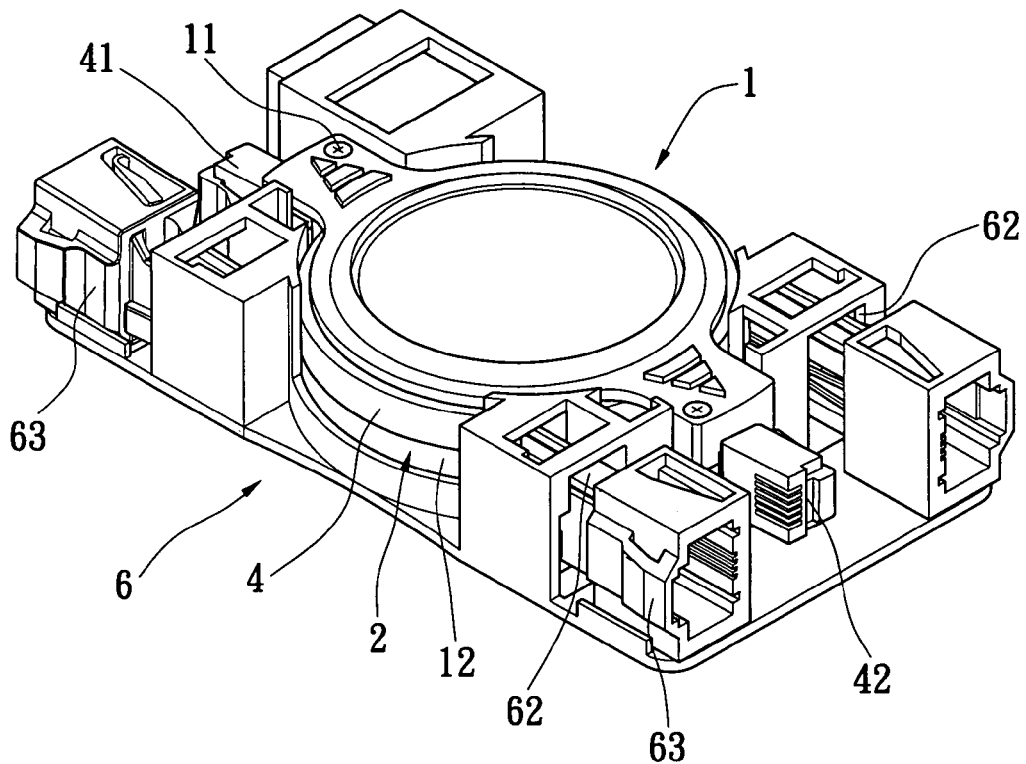
FIG. 4 is a perspective view according to the first embodiment of the present invention.

Referring to FIGS. 2 to 4, the first embodiment of the present invention provides an assembled windlass structure. The assembled windlass structure comprises a top cover 1, a bottom cover 2, a winding box 3, a communication wire 4, a spring 5, and a main body 6. The top cover 1 and the bottom cover 2 are assembled together to form a casing by clamping or a screw 11. The casing has a receiving space 12 formed between the top cover 1 and the bottom cover 2 for receiving the winding box 3, the communication wire 4, and the spring 5. The casing has a first hole 13 and a second hole 14 formed in two ends thereof for penetrating through one side or another side of the communication wire 4, respectively. The top cover 1 has a protrusion shaft 15 formed in an inside wall thereof. The bottom cover 2 has a through hole 16 formed therein for penetration by the protrusion shaft 15.

The winding box 3 is received in the receiving space 12 and has a shaft hole 31, a winding shaft 32, and a receiving groove 33 formed in the winding shaft 32. The winding box 3 is pivoted on the protrusion shaft 15 by the shaft hole 31 for rotating in the receiving space 12.

The communication wire 4 is a flat-shaped line or a circular-shape line (show in the FIG. 6) and has two connectors 41, 42 respectively connected to two ends thereof. The two connectors 41, 42 are a USB connector or plug. The communication wire 4 surrounds the winding shaft 32 of the winding box 3. The two connectors 41, 42 extend out of the first hole 13 and the second hole 14, respectively.

The spring 5 is received in the receiving groove 33 of the winding box 3. The spring 5 has one clamping side 51 clamped on the winding box 3 for connecting the winding box 3. The spring 5 has another clamping side 52 clamped on the protrusion shaft 15 for connecting the casing. The spring 5 is thus connected between the winding box 3 and the casing for storing the kinetic energy by rotating the winding box 3.

The main body 6 has an assembly groove 61 corresponding to the casing composed of the top cover 1 and the bottom cover 2. The casing can be assembled in or disassembled from the assembly groove 61 or be fixed in the assembly groove 61. The main body 6 has a plurality of receiving grooves 62 for receiving any kind of connected head 63. The connected head 63 is any kind of connector or plug.

Referring to the FIG. 4, the assembled windlass structure will be assembled according to the above description. The communication wire 4 with predetermined length is rolled up and received in the assembled windlass structure. The communication wire 4 can be pulled out of or returned to the assembled windlass structure by stored energy of the spring 5 for preventing the communication wire 4 from becoming snarled outside the casing.

Additionally, the winding box 3 further comprises a positioning seat 34 projected thereon. The positioning seat 34 has a plurality of clamping grooves 35 formed therein. The positioning seat 34 is disposed through the through hole 16 and out of the bottom cover 2. The assembled windlass structure further comprises a reciprocating control device 7 connected adjacent to the winding box 3. The reciprocating control device 7 includes an oscillatable pendulous piece 71 and a rotatable ratchet 72. Both the pendulous piece 71 and the ratchet 72 are pivoted out of the bottom cover 2 and are used to drive the positioning seat 34 for fixing or returning the communication wire 4.

The assembled windlass structure further comprises an external cover 8 fixed or clamped on an outside of the bottom cover 2. The external cover 8 has a shaft seat 81 formed inside and corresponding to one side of the protrusion shaft 15. The one side of the protrusion shaft 15 is fixed in the shaft seat 81. The external cover 8 has a screw 82 penetrating through the shaft seat 81 into the protrusion shaft 15 for fixing the external cover 8 on the protrusion shaft 15.

Figure 5:
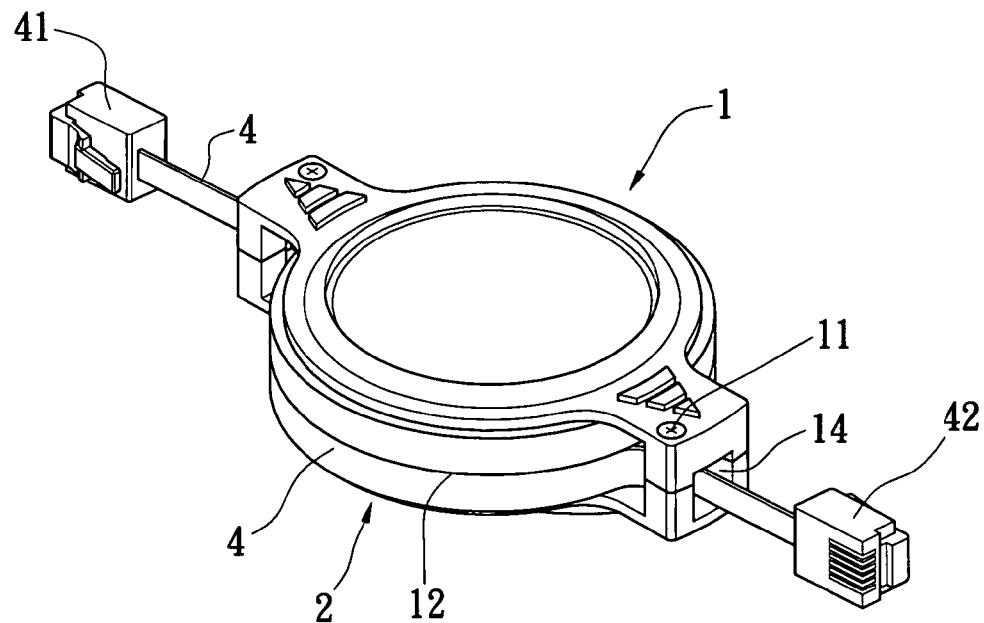
FIG. 5 is another perspective view according to the first embodiment of the present invention (omitting the main body)

Referring to FIG. 4, the first embodiment of the present invention is composed of the top cover 1, the bottom cover 2, the winding box 3, the communication wire 4, the spring 5, and the main body 6. Referring to FIG. 5, the main body 6 separated from the first embodiment of the present invention can be used, too.

Figure 6:
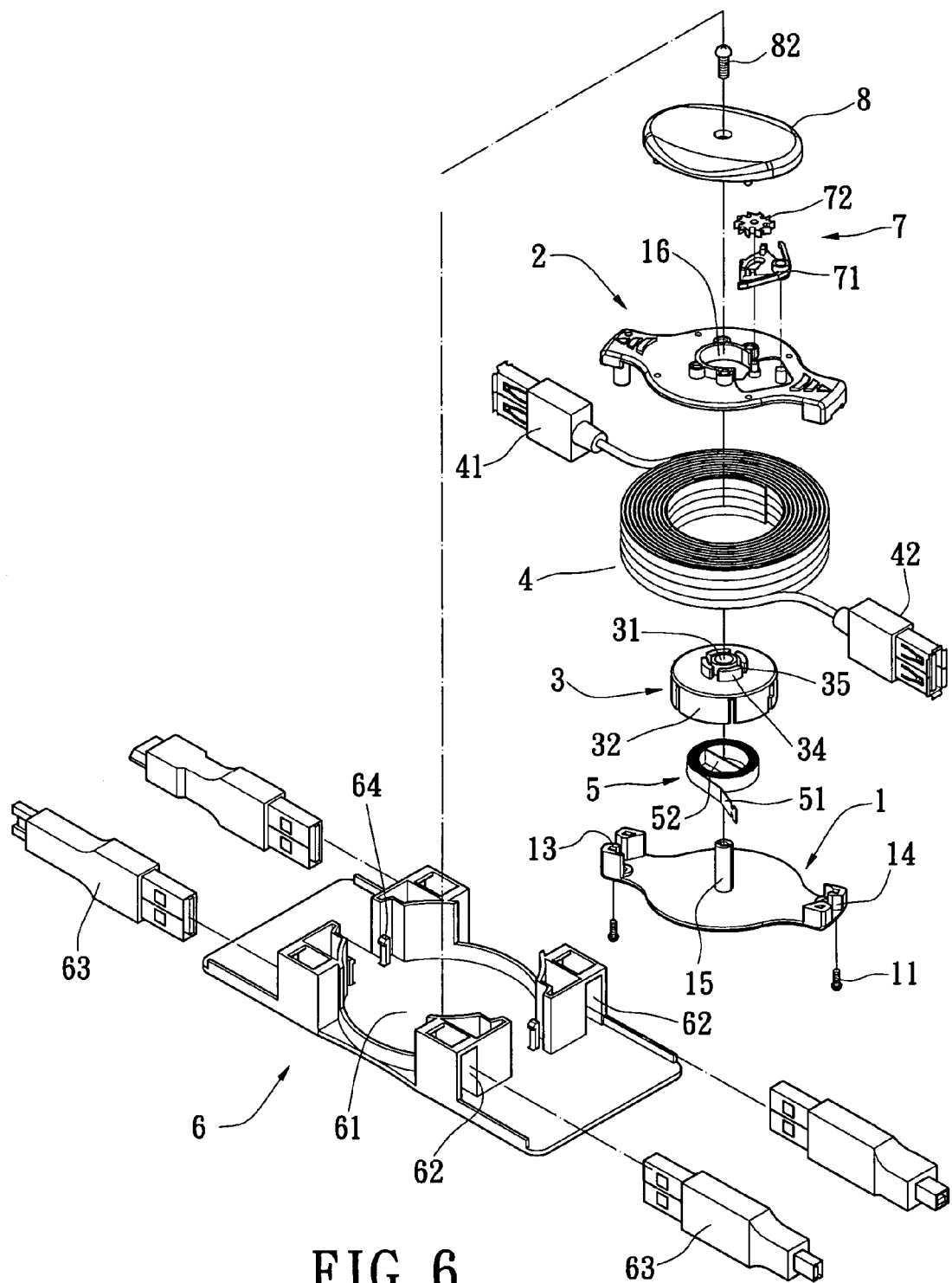
FIG. 6 is an exploded view according to the second embodiment of the present invention.

Referring to FIG. 6, the two connectors 41, 42 are USB connector or any kind of connector and the connected head 63 is a USB head or any kind of connected head.

Figure 7:
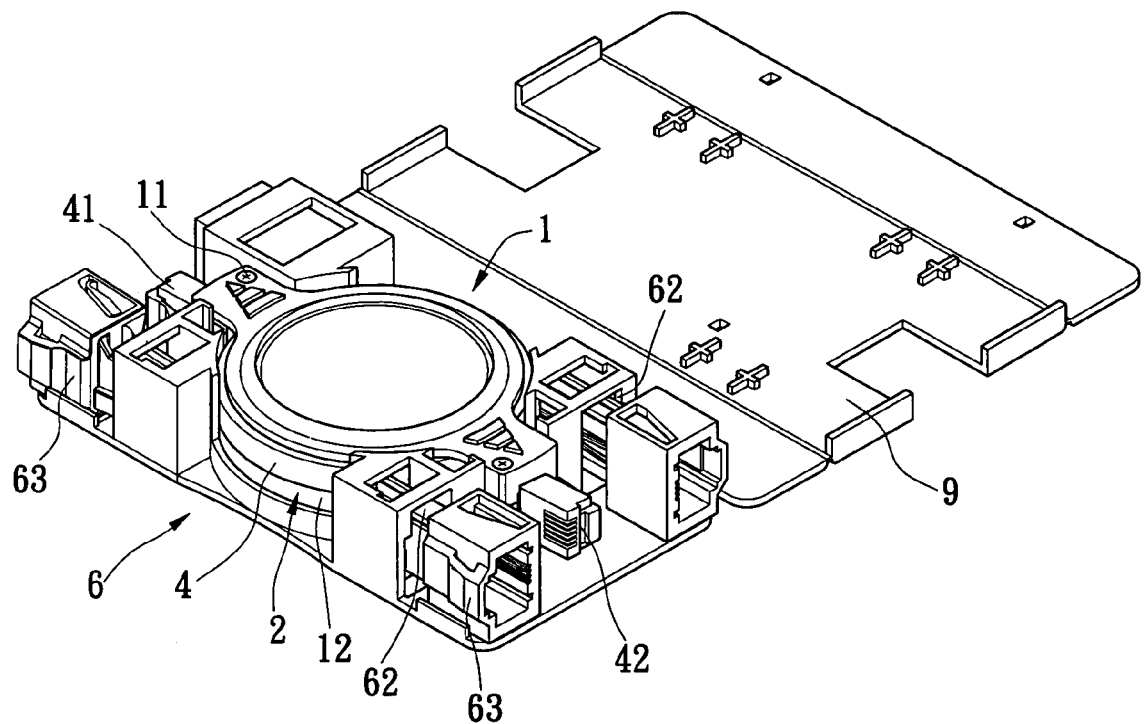
FIG. 7 is a perspective view according to third embodiment of the present invention.
Figure 7A:
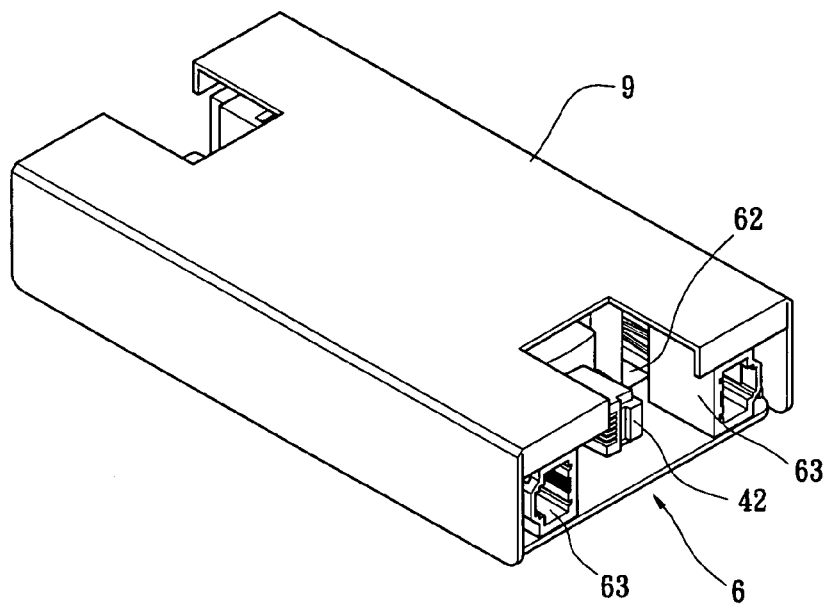
FIG. 7A is a perspective view according to the third embodiment of the present invention (the protective cover is covered on the main body)
Figure 10:
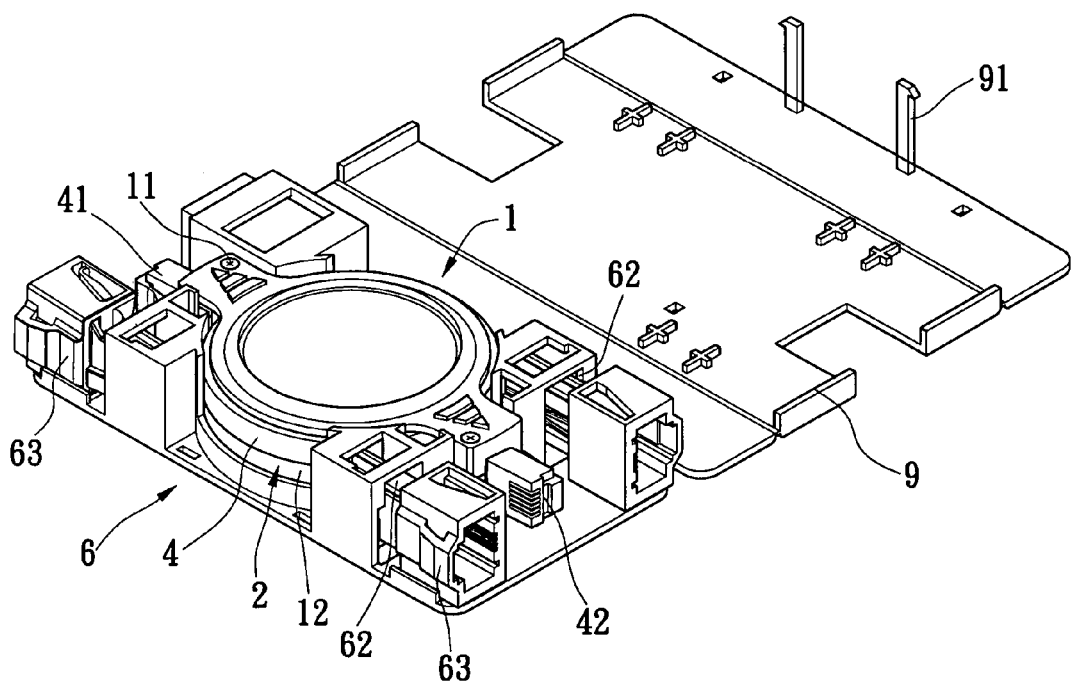
FIG. 10 is a perspective view according to the sixth embodiment of the present invention.

Referring to FIG. 7 and 7A, the assembled windlass structure further comprises a protective cover 9 integrally formed or clamped on the main body 6. Referring to FIG. 10, the protective cover 9 can be open or cover the main body 6, too. The protective cover 9 also has a hook 91 for hooking the protective cover 9 on the main body 6 and covering the reciprocating control device 7.

Figure 8:
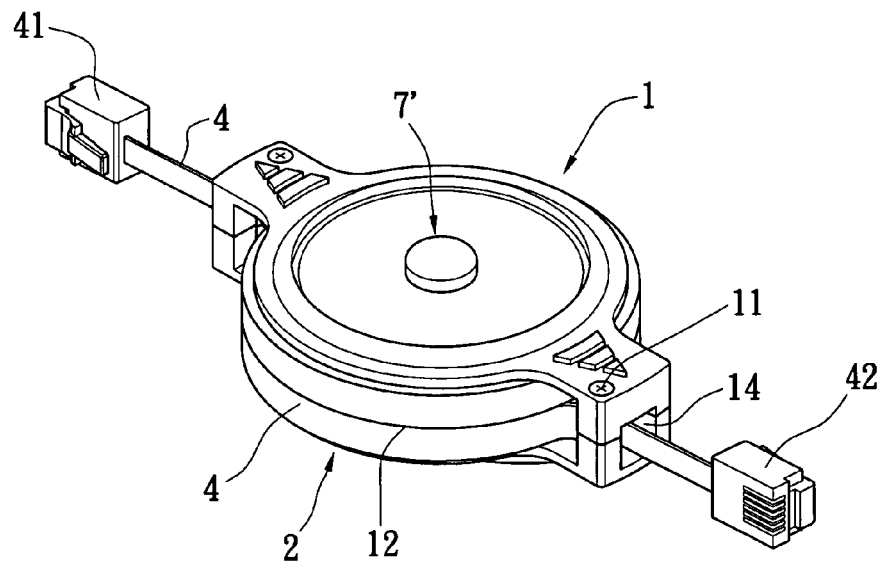
FIG. 8 is a perspective view according to the fourth embodiment of the present invention.

Referring to FIG. 8, the casing further comprises a reciprocating control device 7' with a press-button for controlling the communication wire 4 to fixed in or returned to the casing.

Figure 9:
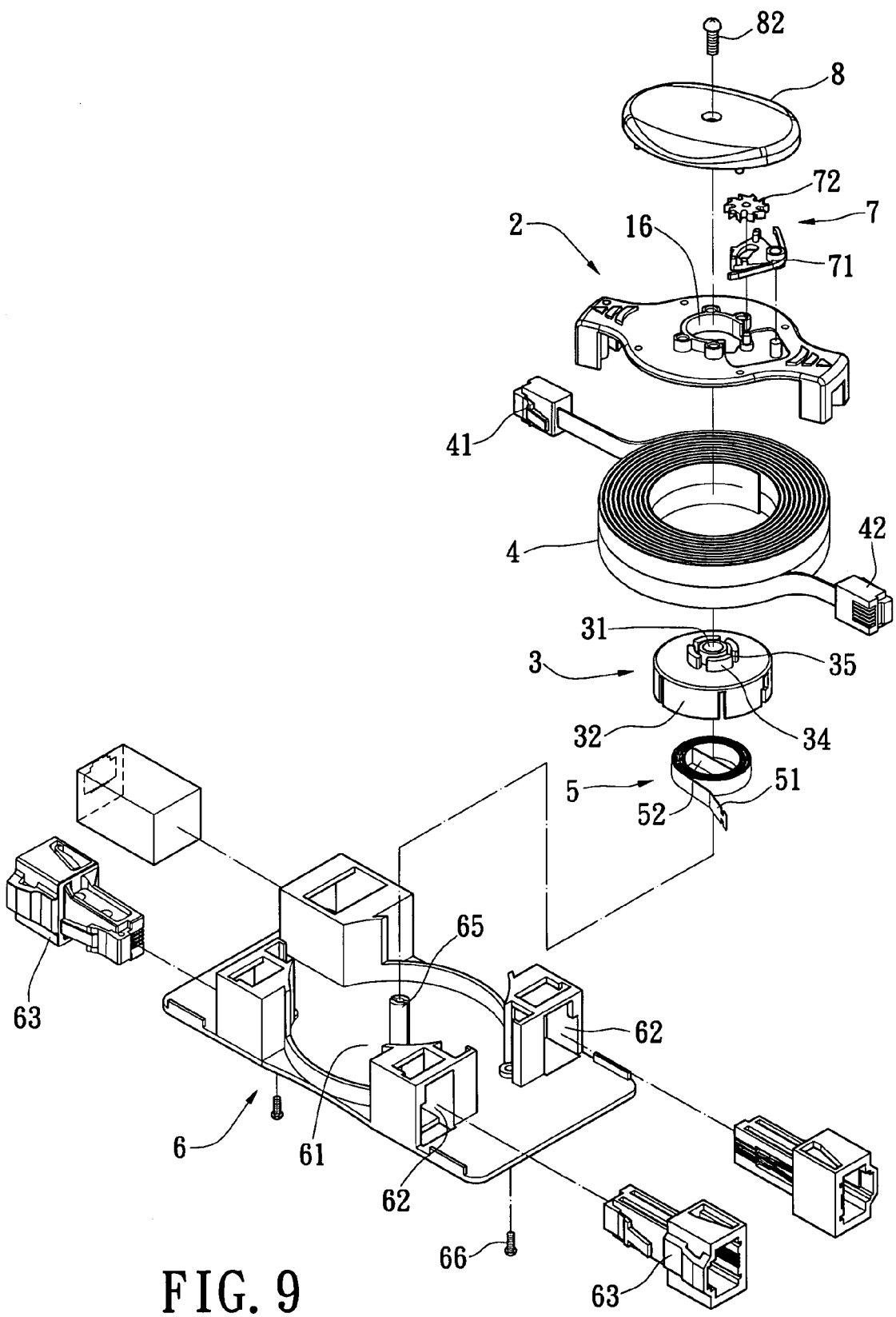
FIG. 9 is an exploded view according to the fifth embodiment of the present invention.

Referring to FIG. 9, the top cover 1 can be omitted and the bottom cover 2 instead of the top cover 1 is assembled on the main body 6. The assembly groove 61 of the main body 6 has a hollow protrusion shaft 65 formed thereon. The winding box 3 is pivoted on the protrusion shaft 65 by the shaft hole 31 for rotating the winding box 3 in the assembly groove 61. The clamping side 52 of the spring 5 is clamped on the protrusion shaft 65. The bottom cover 2 is assembled on the main body 6 by screws 66. The protrusion shaft 65 with one side is received in the shaft seat 81 for fixing the external cover 8 on the protrusion shaft 65.

Although the present invention has been described with reference to the preferred embodiment thereof, it will be understood that the invention is not limited to the details thereof. Various substitutions and modification have suggested in the foregoing description, and other will occur to those of ordinary skill in the art. Therefore, all such substitutions and modifications are intended to be embraced within the scope of the invention as defined in the appended claims.

What is claimed is:

1. An assembled windlass structure, comprising:
   a casing having a top cover and a bottom cover assembled together, and a receiving space formed between the top cover and the bottom cover;
   a winding box rotatably arranged in the receiving space;
   a communication wire having two connectors connected to two ends thereof, respectively, the communication wire wound around the winding box, and the two ends of the communication wire extended out of the casing;
   a spring connected between the easing and the winding box;
   a rectangularly shaped main body having an assembly groove centrally formed therein, the casing being removably received and releasably clampingly engaged in the assembly groove, the main body having a plurality of receiving grooves formed on opposing sides of the assembly groove at respective corners of the main body; and
   a plurality of connecting devices respectively removably received and stored in the plurality of receiving grooves.

2. The assembled windlass structure as claimed in claim 1, wherein the top cover and the bottom cover are clamped or locked by screws to each other to form the casing.

3. The assembled windlass structure as claimed in claim 1, wherein the casing has a first hole and a second hole respectively formed in two sides thereof, and the two ends of the communication wire penetrate trough the first and the second hole, respectively.

4. The assembled windlass structure as claimed in claim 1, wherein the casing further comprises a reciprocating control device with a press-button, and the communication wire is fixed at or returned to the casing by pressing the press-button.

5. The assembled windlass structure as claimed in claim 1, wherein the receiving space has a protrusion shaft formed inside, the winding box has a shaft hole, and the winding box is pivoted at the protrusion shaft by the shaft hole.

6. The assembled windlass structure as claimed in claim 1, wherein the winding box has a winding shaft and a receiving groove formed in an inside of the winding shaft, the communication wire is wound around the winding shaft, and the spring is received in the receiving groove.

7. The assembled windlass structure as claimed in claim 1, wherein the winding box further comprises a positioning seat having a plurality of clamping grooves, and the casing further comprises a reciprocating control device having an oscillatable pendulous piece and a rotatable ratchet both used to drive the positioning seat for fixing or returning the communication wire.

8. The assembled windlass structure as claimed in claim 7, wherein the assembled windlass structure further comprises an external cover fixed on the bottom cover for covering the reciprocating control device.

9. The assembled windlass structure as claimed in claim 1, wherein the connector is a USB connector or plug.

10. The assembled windlass structure as claimed in claim 1, wherein the assembled windlass further comprises a protective cover connected to the main body.

11. The assembled windlass structure as claimed in claim 10, wherein the protective cover wit one side is connected to the main body for opening or covering the main body, and the protective cover has a hook for hooking the protective cover on the main body.

12. An assembled windlass structure comprising:
- a bottom cover;
- a rectangularly shaped main body having an assembly groove centrally formed therein, wherein both the main body and the bottom cover form a casing, the main body having a plurality of receiving grooves formed on opposing sides of the assembly groove at respective corners of the main body for releasably receiving and storing connecting devices;
- a winding box rotatably assembled in a receiving space defined between the bottom cover and the main body;
- a communication wire having two connectors connected to two ends thereof, respectively, the communication wire wound around the winding box, and the two ends of the communication wire extending out of the casing; and
- a spring connected between the casing and the winding box.

* * * * *